United States Patent
Wu

(10) Patent No.: US 10,797,627 B2
(45) Date of Patent: Oct. 6, 2020

(54) COMPRESSED AIR TURBINE DC POWER GENERATOR SYSTEM

(71) Applicant: Suzhou DSM Green Power Ltd., Suzhou (CN)

(72) Inventor: Walter Wu, Suzhou (CN)

(73) Assignee: SUZHOU DSM GREEN POWER LTD., Suzhou (CN)

( * ) Notice: Subject to any disclaimer, the term of this patent is extended or adjusted under 35 U.S.C. 154(b) by 0 days.

(21) Appl. No.: 16/331,937

(22) PCT Filed: Jun. 23, 2017

(86) PCT No.: PCT/CN2017/089874
§ 371 (c)(1),
(2) Date: Mar. 8, 2019

(87) PCT Pub. No.: WO2018/227652
PCT Pub. Date: Dec. 20, 2018

(65) Prior Publication Data
US 2020/0169201 A1  May 28, 2020

(30) Foreign Application Priority Data

Jun. 15, 2017 (CN) .......................... 2017 1 0447309

(51) Int. Cl.
*H02P 9/04* (2006.01)
*F01D 15/10* (2006.01)
*H02P 101/25* (2016.01)

(52) U.S. Cl.
CPC ................ *H02P 9/04* (2013.01); *F01D 15/10* (2013.01); *F05D 2220/30* (2013.01);
(Continued)

(58) Field of Classification Search
CPC .................................. H02P 9/04; F01D 15/10
(Continued)

(56) References Cited

U.S. PATENT DOCUMENTS 4,229,661 A * 10/1980 Mead ........................ F03D 9/17
290/44
4,311,917 A * 1/1982 Hencey, Jr. .............. B60K 3/00
180/302
(Continued)

FOREIGN PATENT DOCUMENTS

CN 101005222 A 7/2007
CN 102320237 A 1/2012
(Continued)

OTHER PUBLICATIONS

International Search Report and Written Opinion dated Feb. 26, 2018 for International Application No. PCT/CN2017/089874 in 7 pages.

*Primary Examiner* — Pedro J Cuevas
(74) *Attorney, Agent, or Firm* — Womble Bond Dickinson (US) LLP

(57) ABSTRACT

A compressed air turbine DC power generator system, comprising: an aerodynamic turbine engine; a direct current generator (2) used for generating a direct current by using power output of the aerodynamic turbine engine as a driving input; and a control unit (3) used for controlling the rotating speed of the aerodynamic turbine engine to generate the power output and adjusting the output current and/or the output voltage of the direct current generator (2). The compressed air turbine DC power generator system is miniaturized and has high integration level, effectively overcomes the disadvantages such as low power density and great vibration noise of a power generation system with an internal combustion engine, and has a high industrial application value. The compressed air turbine DC power generator system can be used as an auxiliary power supply in the (Continued)

development process of an electric automobile, thereby effectively resolving the problem of range anxiety of a pure electric automobile.

8 Claims, 2 Drawing Sheets

(52) U.S. Cl.
CPC .... *F05D 2220/762* (2013.01); *F05D 2240/60* (2013.01); *H02P 2101/25* (2015.01)

(58) Field of Classification Search
USPC .................................................. 290/40 B, 52
See application file for complete search history.

(56) References Cited

U.S. PATENT DOCUMENTS

| | | | |
|---|---|---|---|
| 6,054,838 A | 4/2000 | Tsatsis | |
| 6,927,503 B2* | 8/2005 | Enis .................... | F03D 9/00 290/55 |
| 6,963,802 B2* | 11/2005 | Enis .................... | F03D 7/048 702/2 |
| 7,454,911 B2* | 11/2008 | Tafas ................... | F01K 23/065 60/618 |
| 7,719,127 B2* | 5/2010 | Bertolotti ............. | F03D 9/255 290/44 |
| 8,245,517 B2* | 8/2012 | Tong ................... | F01D 19/00 60/772 |
| 8,288,880 B2* | 10/2012 | Olsen .................. | F16H 61/444 290/40 C |
| 8,324,750 B2* | 12/2012 | Bertolotti ............. | F03D 9/17 290/44 |
| 8,571,830 B2* | 10/2013 | Bal ...................... | G01R 31/343 702/183 |
| 8,723,352 B2* | 5/2014 | Reddy ................. | F03B 13/24 290/53 |
| 8,803,461 B2* | 8/2014 | Tiwari ................. | H02P 23/14 318/459 |
| 9,669,696 B2* | 6/2017 | Chatroux ............. | F02D 41/107 |
| 9,776,492 B2* | 10/2017 | Chen ................... | B60K 6/30 |
| RE47,647 E * | 10/2019 | Domes ................ | B60K 15/03 |
| 10,696,417 B2* | 6/2020 | Ullyott ................ | F02B 41/10 |
| 10,710,738 B2* | 7/2020 | Ullyott ................ | F02C 7/36 |
| 2003/0189339 A1* | 10/2003 | Gupta .................. | F01D 15/10 290/52 |
| 2007/0007771 A1 | 1/2007 | Biddle et al. | |
| 2007/0101716 A1* | 5/2007 | Tafas ................... | B60L 3/0023 60/618 |
| 2008/0014079 A1 | 1/2008 | Lockwood | |
| 2008/0022681 A1* | 1/2008 | Tafas ................... | F01K 23/065 60/618 |
| 2008/0022682 A1* | 1/2008 | Tafas ................... | F01K 23/065 60/618 |
| 2008/0034728 A1* | 2/2008 | Tafas ................... | F01K 23/065 60/39.182 |
| 2008/0034729 A1* | 2/2008 | Tafas ................... | F01K 23/065 60/39.182 |
| 2010/0244461 A1 | 9/2010 | Delf | |
| 2010/0293961 A1* | 11/2010 | Tong ................... | F01D 19/00 60/778 |
| 2010/0326749 A1 | 12/2010 | Mensah | |
| 2011/0014828 A1* | 1/2011 | Domes ................ | B60K 6/12 440/3 |
| 2011/0204634 A1* | 8/2011 | Skala ................... | F03D 1/04 290/44 |
| 2011/0320169 A1* | 12/2011 | Bal ...................... | G01R 31/343 702/183 |
| 2012/0038157 A1* | 2/2012 | Skala ................... | F03D 1/04 290/44 |
| 2012/0161684 A1* | 6/2012 | Tiwari ................. | H02P 23/14 318/490 |
| 2012/0280504 A1* | 11/2012 | Reddy ................. | F03B 13/24 290/53 |
| 2013/0030742 A1* | 1/2013 | Banerjee ............. | G01R 31/343 702/76 |
| 2013/0214537 A1* | 8/2013 | Hashimoto .......... | F03D 15/00 290/55 |
| 2016/0325612 A1* | 11/2016 | Chatroux ............. | F02B 63/04 |
| 2020/0173373 A1* | 6/2020 | Ferns .................. | F02C 9/00 |
| 2020/0200077 A1* | 6/2020 | Ullyott ................ | F02B 63/04 |
| 2020/0217242 A1* | 7/2020 | Yamashita ........... | F02B 37/04 |

FOREIGN PATENT DOCUMENTS

| | | |
|---|---|---|
| CN | 102358285 A | 2/2012 |
| CN | 203383889 U | 1/2014 |
| CN | 104309494 A | 1/2018 |
| EP | 0609674 A2 | 8/1994 |
| JP | 63253896 A | 10/1988 |
| JP | 1030408 A | 2/1998 |
| JP | 201088288 | 4/2010 |
| RU | 2010117378 A | 1/2008 |
| RU | 2674107 C2 | 11/2013 |

* cited by examiner

COMPRESSED AIR TURBINE DC POWER GENERATOR SYSTEM

CROSS-REFERENCE TO RELATED APPLICATIONS

The present application is based upon and claims the benefits of a priority of Chinese Patent Application No. 201710447309.9, filed on Jun. 15, 2017, the entire contents of which are incorporated herein by reference.

TECHNICAL FIELD

The present disclosure relates to the field of electrical technologies, and in particular to a compressed air turbine DC (direct current) power generator system.

BACKGROUND

At present, various auxiliary power supplies worldwide for pure electric vehicles use a conventional oil/gas piston engine for electrical power generation. The technologies of such engine have been well developed with a variety of products. However, the fundamental problems on low fuel efficiency, great vibration, great noise, and complicated cooling systems by these engines have not been resolved to this day.

SUMMARY

In view of the foregoing problems, the present disclosure proposes a compressed air turbine DC power generator system, comprising:
an aerodynamic turbine engine,
a direct current generator configured to generate a direct current by using power output of the aerodynamic turbine engine as a driving input,
a control unit configured to control a rotating speed of the aerodynamic turbine engine to generate the power output and adjust an output current and/or an output voltage of the direct current generator,
In a possible embodiment, the aerodynamic turbine engine comprises a turbine chamber, a turbine, a power output shaft, an air intake adjusting valve, an inlet port, and an exhaust port, wherein
each of the inlet port and the exhaust port is connected to the turbine chamber,
the air intake adjusting valve is provided at the inlet port,
the turbine is provided in the turbine chamber, and
the turbine is connected to the power output shaft.
In a possible embodiment, the control unit is further configured to send control signal to the air intake adjusting valve; and
the air intake adjusting valve is configured to, when receiving the control signal, open or close and dynamically adjust an air intake flow rate at the inlet port according to the control signal, thereby introducing high-pressure air from the inlet port into the turbine chamber to expand for work, driving the turbine to rotate, so as to adjust the rotating speed and a torque of the power output shaft.
In a possible embodiment, the power output shaft also serves as a rotor shaft of the direct current generator. Two high-speed bearings on the rotor shaft are respectively located at a power output end of the aerodynamic turbine engine and a rear end of the direct current generator.
In a possible embodiment, a housing of the aerodynamic turbine engine and a housing of the direct current generator are integrated together. A stator of the direct current generator is fixed to the housing of the aerodynamic turbine engine.

In a possible embodiment, the turbine of the aerodynamic turbine engine can be of a two-stage turbine structure comprising a first-stage turbine and a second-stage turbine. The first-stage turbine and the second-stage turbine are disposed on a same driving shaft. The first-stage turbine sends exhausted low-pressure air to the second-stage turbine.

In a possible embodiment, the control unit is further configured to receive a power generation activation command from a CAN bus. The power generation activation command is configured to instruct the control unit to control the air intake adjusting valve to open or close and determine a generation mode of the system, including at least one of a current-constant generation mode, a voltage-constant generation mode, a power-constant generation mode, and a power-reduced generation mode.

In a possible embodiment, the control unit is further configured to determine a working state of the aerodynamic turbine engine according to a power reduction ratio when the system enters the power-reduced generation mode, wherein the aerodynamic turbine engine enters an idle state when the power to be generated is less than 30% of a rating power, enters a low-rotating-speed state when the power to be generated is lower than 50% of the rating power, and enters a rating power state in other cases.

In a possible embodiment, the control unit is further configured for excitation control on the direct current generator.

In a possible embodiment, the system further comprises an external excitation unit which is connected to the direct current generator for excitation control on the direct current generator.

In a possible embodiment, the direct current generator is further configured to conduct the power output to a direct current power bus directly via a rectification and feedback the output current and/or the output voltage to the control unit.

The compressed air turbine DC power generator system of the present disclosure is miniaturized and has high integration level, effectively overcomes the disadvantages such as low power density and great vibration noise of a power generator system with an internal combustion engine, and has a high industrial application value. The compressed air turbine DC power generator system can be used as an auxiliary power supply in the development process of an electric automobile, thereby effectively resolving the problem of range anxiety of a pure electric automobile.

Additional features and aspects of the present disclosure will be apparent from the following description of exemplary embodiments with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

Figure 1:
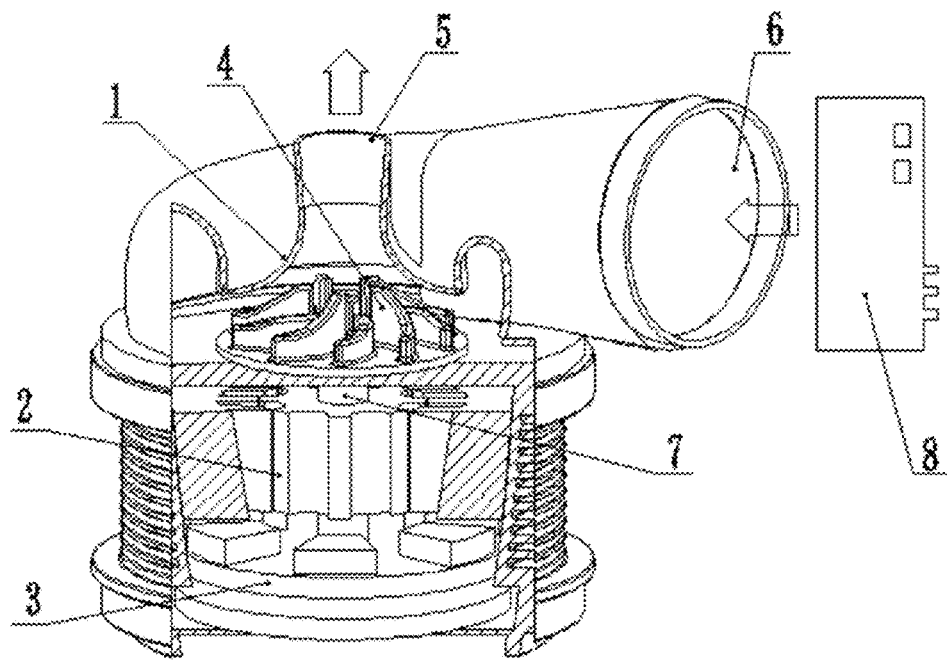
FIG. 1 shows a structural diagram of the compressed air turbine DC power generator system according to one embodiment of the present disclosure.
Figure 2:
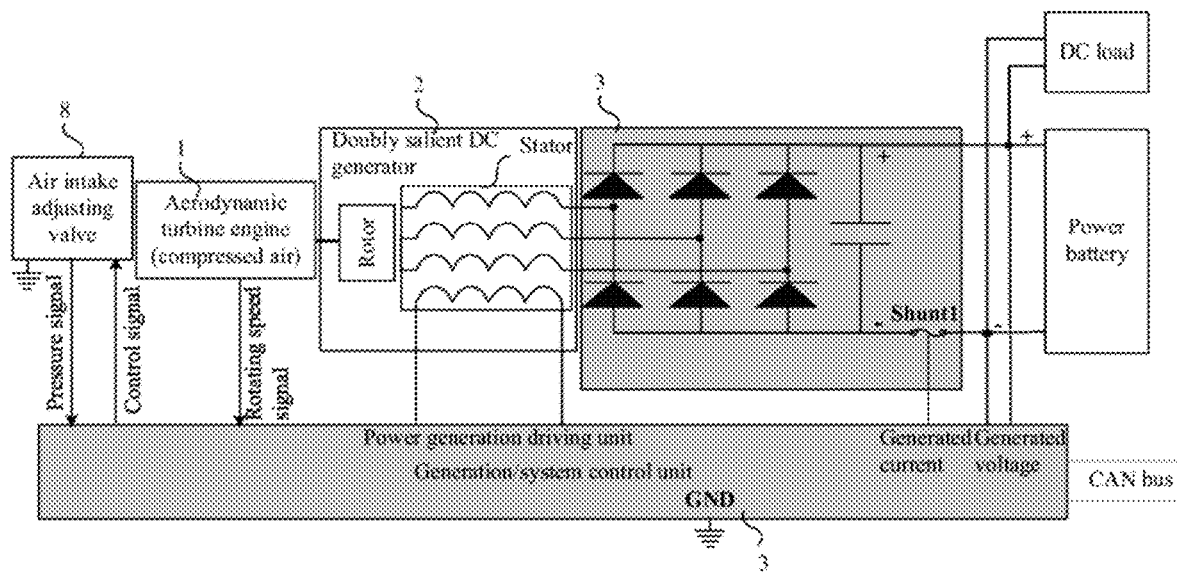
FIG. 2 shows a circuit schematic block diagram of the compressed air turbine DC power generator system according to one embodiment of the present disclosure.

REFERENCE SIGNS 1 turbine chamber; 2 doubly salient generator; 3 generation/system control unit; 4 turbine; 5 exhaust port; 6 inlet port; 7 power output shaft; 8 air intake adjusting valve

DETAILED DESCRIPTION

Various exemplary embodiments, features and aspects of the present disclosure will be described in detail with reference to the drawings. Like reference numerals in the drawings represent elements having the same or similar functions. Although various aspects of examples are shown in the drawings, it is unnecessary to have the drawings rendered in proportion unless otherwise specified.

Herein the term "exemplary" means "used as an instance or embodiment, or explanatory". Any embodiment described as "exemplary" here is not necessarily construed as being superior to or better than other embodiments.

Additionally, numerous details are given in the following embodiments for the purpose of better explanation on the present disclosure. One skilled in the art may understand that the present disclosure can still be realized even without some of those details. Methods, means, elements and circuits that are well known to a person skilled in the art are not described in detail in some embodiments so that the principle of the present disclosure becomes apparent.

With continuous improvements on the turbocharger technologies tier automobile engines and continuous improvements of turbine technologies, the conversion efficiency has been increased significantly. The present disclosure proposes a new solution of a direct current generator driven by an aerodynamic turbine engine with compressed air passing through a turbine. Such a power generator system may use the compressed pressure-constant air output from an onboard high-pressure air reservoir to power a turbine engine, thereby to drive a doubly salient direct current generator for power generation, achieving a high turbine conversion efficiency. The ultra-high rotating speed of the turbine achieves high power density, small size, low vibration and noise, and emission free (with exhaust of air, i.e. zero emission), which is very suitable as an auxiliary power supply for pure electric vehicles. In particular, the low temperature by the expansion of the compressed air eliminates the need of any external cooling for the entire turbine and generator. The turbine also has no lubrication problems. The high-speed bearings of the generator do not require any external cooling system either. Therefore, the whole system is simply structured and of high reliability.

Embodiment 1

FIG. 1 shows a structural diagram of the compressed air turbine DC power generator system according to one embodiment of the present disclosure. As shown in FIG. 1, the compressed air turbine DC power generator system may comprise: an aerodynamic turbine engine (referred as turbine engine or engine); a direct current generator (referred as generator) configured to generate a direct current by using power output of the aerodynamic turbine engine as a driving input; a control unit configured to control a rotating speed of the aerodynamic turbine engine to generate the power output and adjust an output current and/or an output voltage of the direct current generator.

For example, the input shaft of the doubly salient generator is directly connected to the output shaft of the turbine engine to generate the direct current and output a DC current-constant or voltage-constant power. The generation/system control unit 3 is in direct electrical connection with the doubly salient generator 2 and able to receiving generation commands through a CAN (Controller Area Network) bus to adjust the output current or voltage power of the doubly salient generator 2. The generation/system control unit 3 can manage and control the rotating speed of the aerodynamic turbine engine as well as continuously adjust the output current or voltage of the doubly salient generator 2.

In a possible embodiment, the aerodynamic turbine engine may comprise a turbine chamber 1, a turbine 4 (also referred as a turbo mechanism), an exhaust port 5 (also referred as air outlet), an inlet port 6, a power output shaft 7, and an air intake adjusting valve 8. The direct current generator may be a doubly salient generator 2 (also referred as doubly salient direct current generator). The control unit is also referred as the generation/system control unit 3.

The inlet port 6 and the exhaust port 5 each is connected to the turbine chamber 1. The air intake adjusting valve 8 is provided at the inlet port 6. The turbine 4 is provided in the turbine chamber 1. The turbine 4 is connected to the power output shaft 7.

In a possible embodiment, the control unit is configured to send control signal to the air intake adjusting valve. The air intake adjusting valve is configured to, when receiving the control signal, open or close and dynamically adjust the air intake flow rate at the inlet port according to the control signal, introducing high-pressure air from the inlet port into the turbine chamber to expand for work, driving the turbine to rotate, so as to adjust the rotating speed and the torque of the power output shaft.

Specifically, the aerodynamic turbine engine may directly introduce the high-pressure air into the turbo mechanism to expand for work, to drive the turbine to rotate. The low-pressure air then is exhausted from the exhaust port. The air intake adjusting valve receives the control signal from the generation/system control unit to adjust the flow rate of the air intake, so as to adjust the rotating speed and the torque of the output shaft of the turbine engine. The generation/system control unit controls the air intake adjusting valve of the turbine engine to adjust the intake flow volume and flow rate of the engine, which may maintain a constant rotating speed when a DC load, such as a driving motor controller, a power resistor, etc., of the generator changes, and enable a close-loop control for current-constant or voltage-constant generation.

In order to increase the conversion efficiency on the compressed air, the aerodynamic turbine engine may add a second-stage turbine. In a possible embodiment, the turbine of the aerodynamic turbine engine may be of a two-stage turbine structure, including a first-stage turbine and a second-stage turbine. The first-stage turbine and the second-stage turbine are located on the same drive shaft. The first-stage turbine sends the exhausted low-pressure air to the second-stage turbine. With the two-stage turbine structure, the energy remained in the low-pressure air from the first stage is further converted into the power output. This further increases the conversion efficiency of the turbo mechanism and significantly increases the output power of the system.

Embodiment 2

This embodiment is different from the previous one in that, the control unit is further configured for excitation control on the direct current generator. The direct current generator is further configured to conduct the power output to a direct current power bus directly via a rectification and feedback the output current and/or the output voltage to the control unit.

For example, the doubly salient generator 2 receives excitation control from the generation/system control unit 3 (e.g., a generation driving unit thereof) to rectify and then transmit the output voltage or current to the direct current power bus, and feeds back the generated current and the DC voltage to the generation system control unit 3. In this embodiment, a three-phase high-frequency power output by the doubly salient generator 2 is rectified to provide a direct current directly.

In this embodiment, the turbine 4 is coaxial with the generator. In a possible embodiment, the power output shaft also serves as the rotor shaft of the direct current generator. Two high-speed bearings on the rotor shaft are respectively located at the power output end of the aerodynamic turbine engine and the rear end of the direct current generator. The rear end of the direct current generator is the end of the direct current generator which is closer to the generation system control unit 3.

Embodiment 3

This embodiment is different from the previous ones in that, the entire power generator system according to this embodiment is an entire integrated module which is attachable and detachable integrally as shown my FIG. 1. As the compressed air turbine DC power generator system does not have any vibrating pan, no vibration-proof structure is required during the installation, facilitating the integrated mechanical assembly and design for the entire vehicle.

In a possible embodiment, the housing of the aerodynamic turbine engine and the housing of the direct current generator are structured into one piece. The stator of the direct current generator is fixed together with the housing of the aerodynamic turbine engine. The aerodynamic turbine engine absorbs heat during expansion of the compressed air, providing cooling, for the stator of the generator directly via the generator housing. Therefore, the generator does not need any additional heat dispersion structure, reducing the overall size and weight of the generator. Moreover, the small rotational inertia of the rotor of the doubly salient generator is a perfect match for the ultra-high rotating speed output by the aerodynamic turbine engine for power generation, achieving high generation efficiency and high power density per unit volume.

Embodiment 4

This embodiment is different from the previous ones in that, the power generator system may further comprise an external excitation unit which is connected to the direct current generator for excitation control on the direct current generator. The direct current generator is further configured to conduct the power output to a direct current power bus directly via a rectification and feedback the output current and/or the output voltage to the control unit.

For example, in this embodiment, the generation'system control unit 3 is built-in in the doubly salient generator 2 and performs the excitation control using the power output by an external power battery as an excitation source, so as to enable direct dynamic adjustments on the generated current (or referred as output current, DC current, etc.) or the generated voltage (or referred as output voltage, DC voltage, etc.) according to the desired power.

Embodiment 5

This embodiment is different from the previous ones in that, the control modes of the generation:/system control unit 3 include a current-constant generation mode, a voltage-constant generation mode, a power-constant generation mode, and the likes.

In a possible embodiment, the control unit is further configured to receive from the CAN bus a power generation activation command which instructs the control unit to control the air intake adjusting valve to open or close and determine a generation mode for the system, including at least one of a current-constant generation mode, a voltage-constant generation mode, a power-constant generation mode, and a power-reduced generation mode.

In a possible embodiment, the control unit is further configured to determine a working state of the aerodynamic turbine engine according to a power reduction ratio when the system enters the power-reduced generation mode, wherein the aerodynamic turbine engine enters an idle state when the power to be generated is less than 30% of the rating power, enters a low-rotating-speed state when the power to be generated is lower than 50% of the rating power, and enters a rating power state in other cases.

The generation/system control unit enables a close-loop control for current-constant generation or voltage-constant generation. For example, the control process for power generation may be a process of PID (Proportion Integration Differentiation) close-loop control. In the control mode for current-constant generation, the PID control consists of an outer loop control for the generated current and an inner loop control for the excitation current, and takes a target generated current in a CAN command received from the CAN bus as the target for control, to adjust the actual generated current rapidly with the changes in the voltage and the current output by the system. In the control mode for voltage-constant generation, the PID control consists of an outer loop control for the generated voltage and an inner loop control for the excitation current, and takes a target generated voltage from the CAN command as the target for control, to adjust the actual generated voltage with the changes in the DC current and the voltage. In the control mode for power-constant generation, the PID control consists of an outer loop control for the power to be generated and an inner loop control for the excitation current, and takes a target power to be generated from the CAN command as the target for control, to adjust the actual power to be generated with the changes in the DC voltage and current.

According to the foregoing, the compressed air turbine DC power generator system according to the present disclosure is miniaturized and has high integration level. Therefore, the system can be used as an auxiliary power supply in the development process of an electric automobile, thereby effectively resolving the problem of range anxiety of a pure electric automobile. The present disclosure effectively overcomes the disadvantages such as low power density and great vibration noise of a power generation system with an internal combustion engine, and has a high industrial application value.

Figure 3:
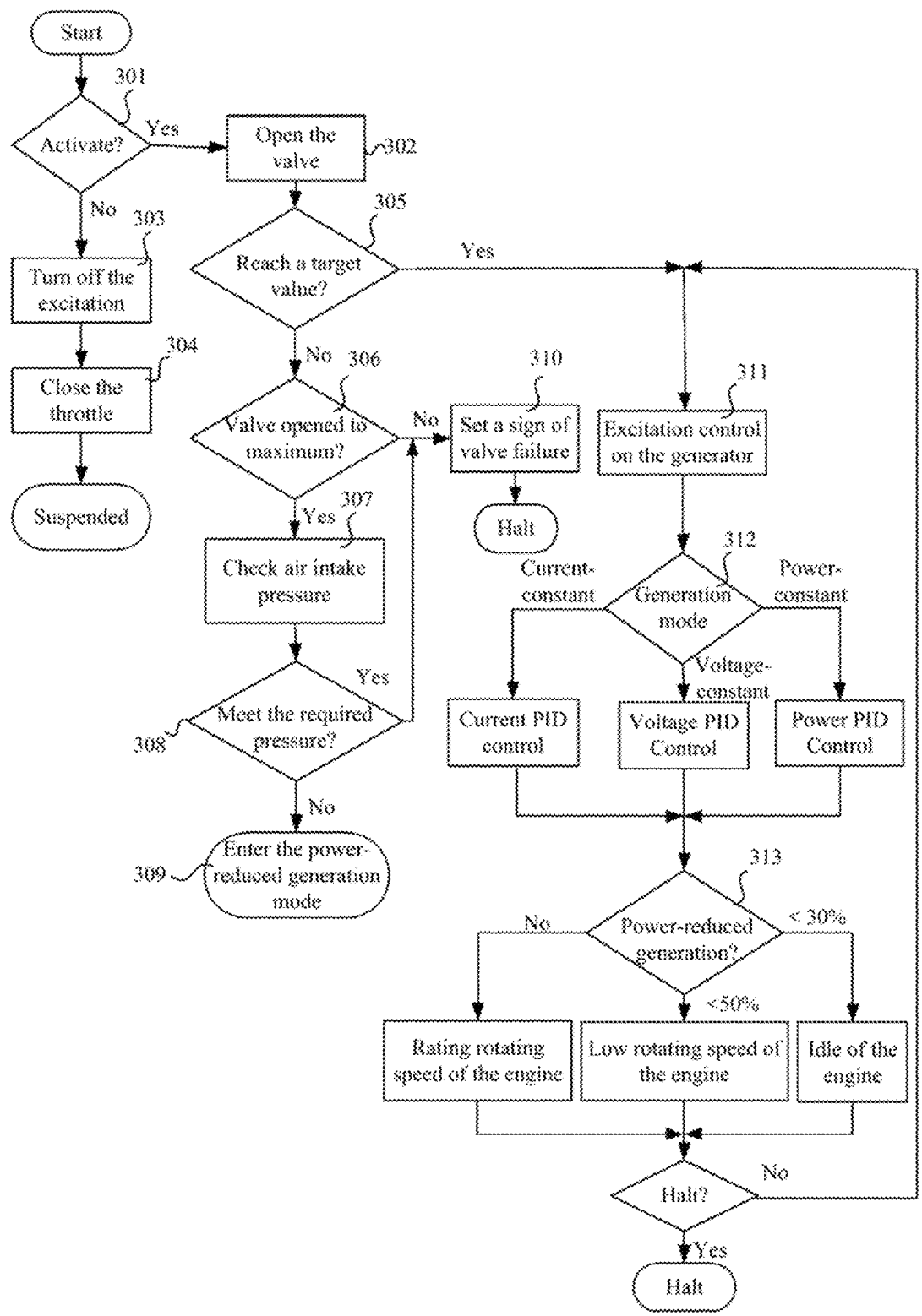
FIG. 3 shows a flow chart of the main control software of the compressed air turbine DC power generator system according to one embodiment of the present disclosure.

As shown in FIG. 3, an exemplary work flow of the main control software of the present disclosure is described below.

Firstly, the system checks the CAN command state immediately after being powered on, to determine whether there is a power generation activation command (301). If not, the excitation is turned off (303), and the air throttle (or referred as a compressed air adjusting valve, an air intake adjusting valve, an adjusting valve, etc.) is closed so that the system is in a suspend mode.

Secondly, upon the receiving of the power generation activation command (also referred as an activation command), the system may immediately open the air intake adjusting valve (302) and monitor the rotating speed of the turbine to determine whether the rotating speed has reached a target value (305). If the rotating speed cannot reach a predetermined target, the system determines whether the air intake adjusting valve has been opened to the maximum. If yes, the air intake pressure is checked (307). If the air intake pressure for the turbo mechanism still cannot meet the required level (308), it means that the pressure of the compressed air in the turbine chamber is insufficient, and the system enters the power-reduced generation mode (309). If the air intake adjusting valve has not been opened to maximum, it means that the air intake adjusting valve fails, and a sign of valve failure can be set (310). In such case, the system stops working and enters a halt mode.

Thirdly, if the rotating speed reaches the predetermined target, the system enters a normal working state and performs excitation control on the generator (311). The system determines a generation mode according to the CAN command (312), e.g. including the current-constant generation mode, the voltage-constant generation mode, and the power-constant generation mode.

Fourthly, if it is determined that the system needs to enter the power-reduced generation mode (313), the working state of the aerodynamic turbine engine can be determined according to power reduction ratio. For example, the aerodynamic turbine engine enters an idle state when the power to be generated is less than 30% of the rating power, enters a low-rotating-speed state when the power to be generated is lower than 50% of the rating power, and enters a rating power state in other cases.

The present disclosure proposes a power generation by using compressed air as the power to drive the doubly salient direct current generator via the aerodynamic turbine engine as desired, including current-constant generation, voltage-constant generation and the likes, and is suitable as an auxiliary power source for pure electric vehicles, etc.

The descriptions of the various examples have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical applications or technical improvements over technologies found in the marketplace, or to enable others of ordinary skill in the art to understand the examples disclosed herein.

What is claimed is:

1. A compressed air turbine DC power generator system, comprising:
    an air pressure powered turbine engine;
    a direct current generator configured to generate a direct current by using power output of the air pressure powered turbine engine as a driving input; and
    a control unit configured to control a rotating speed of the air pressure powered turbine engine to generate the power output and adjust an output current and/or an output voltage of the direct current generator,
    wherein the air pressure powered turbine engine comprises an air intake adjusting valve, and the control unit is further configured to receive a power generation activation command from a CAN bus, the power generation activation command is configured to instruct the control unit to control the air intake adjusting valve to open or close and determine a generation mode of the system, including at least one of a current-constant generation mode, a voltage-constant generation mode, a power-constant generation mode, and a power-reduced generation mode.

2. The system according to claim 1, wherein the air pressure powered turbine engine further comprises a turbine chamber, a turbine, a power output shaft, an inlet port, and an exhaust port,
    each of the inlet port and the exhaust port is connected to the turbine chamber,
    the air intake adjusting valve is provided at the inlet port,
    the turbine is provided in the turbine chamber, and
    the turbine is connected to the power output shaft.

3. The system according to claim 2, wherein the control unit is further configured to send control signal to the air intake adjusting valve; and
    the air intake adjusting valve is configured to, when receiving the control signal, open or close and dynamically adjust an air intake flow rate at the inlet port according to the control signal, thereby introducing high-pressure air from the inlet port into the turbine chamber to expand to do work, driving the turbine to rotate, so as to adjust a rotating speed and a torque of the power output shaft.

4. The system according to claim 1, wherein a housing of the air pressure powered turbine engine and a housing of the direct current generator are integrated together, and a stator of the direct current generator is fixed to the housing of the air pressure powered turbine engine.

5. The system according to claim 1, wherein the control unit is further configured to determine a working state of the air pressure powered turbine engine according to a power reduction ratio when the system enters the power-reduced generation mode, and the air pressure powered turbine engine is configured to enter an idle state when a power to be generated is less than 30% of a rating power, enter a low-rotating-speed state when the power to be generated is lower than 50% of the rating power, and enter a rating power state in other cases.

6. The system according to claim 1, wherein the control unit is further configured for excitation control on the direct current generator.

7. The system according to claim 6, wherein the direct current generator is further configured to conduct the power output to a direct current power bus directly after being rectified and feedback the output current and/or the output voltage to the control unit.

8. The system according to claim 1, further comprising an external excitation unit which is connected to the direct current generator for excitation control on the direct current generator.

* * * * *